United States Patent
Garneau et al.

(10) Patent No.: US 9,810,286 B2
(45) Date of Patent: Nov. 7, 2017

(54) FUEL TANK, RADIATOR, PEDAL BOX ASSEMBLY, REVERSE TRANSMISSION SYSTEM AND ELECTRIC CONTROL MODULE FOR VEHICLES

(71) Applicant: 9158-7147 QUEBEC INC., Boucherville (CA)

(72) Inventors: Francois Garneau, Contrecoeur (CA); Simon-Charles Chicoine, Marieville (CA); Maxime Gill, Contrecoeur (CA)

(73) Assignee: 9158-7147 Quebec Inc., Boucherville (CA)

( * ) Notice: Subject to any disclaimer, the term of this patent is extended or adjusted under 35 U.S.C. 154(b) by 67 days.

(21) Appl. No.: 14/768,528

(22) PCT Filed: Feb. 18, 2014

(86) PCT No.: PCT/CA2014/000120
§ 371 (c)(1),
(2) Date: Aug. 18, 2015

(87) PCT Pub. No.: WO2014/124526
PCT Pub. Date: Aug. 21, 2014

(65) Prior Publication Data
US 2015/0377324 A1    Dec. 31, 2015

Related U.S. Application Data

(60) Provisional application No. 61/765,926, filed on Feb. 18, 2013.

(51) Int. Cl.
*F16H 3/08*    (2006.01)
*F16H 3/30*    (2006.01)
(Continued)

(52) U.S. Cl.
CPC ............ *F16H 3/30* (2013.01); *B60K 15/073* (2013.01); *B60K 15/077* (2013.01); *B60K 17/08* (2013.01);
(Continued)

(58) Field of Classification Search
CPC ..................... F16H 37/021; F16H 2003/0931
(Continued)

(56) References Cited

U.S. PATENT DOCUMENTS 4,852,427 A * 8/1989 van der Veen ........ F16H 47/065
475/52
5,063,817 A    11/1991 Bogert
(Continued)

OTHER PUBLICATIONS

International Search Report of PCT/CA2014/000120; dated May 7, 2014; Arthur Gary Grant.

*Primary Examiner* — Ha D Ho
(74) *Attorney, Agent, or Firm* — Benoit & Cote Inc.

(57) ABSTRACT

A reverse transmission system for a vehicle for engaging a reverse action on a normally forward action only engine transmission having a longitudinal orientation driveshaft output, the reverse transmission system comprising a gear rotatably connected to the longitudinal orientation driveshaft output of a normally forward action only engine transmission output; a shaft rotatably connected to the gear for transmitting power from the normally forward action only engine transmission output to the shaft; a chain sprocket connected to a chain drive and to the shaft for providing a transverse orientation output to the chain drive to change the direction of rotation of the driveshaft output, thereby for engaging the vehicle in the reverse action; and a reverse fork configured to actuate a reverse dog configured to slide upon the shaft to reversibly engage a reverse gear engaged to a first gear of the engine transmission.

5 Claims, 10 Drawing Sheets

(51) Int. Cl.

| | |
|---|---|
| *B60K 15/077* | (2006.01) |
| *B60K 15/073* | (2006.01) |
| *F28F 9/00* | (2006.01) |
| *F28F 13/06* | (2006.01) |
| *F28D 1/02* | (2006.01) |
| *F16H 63/30* | (2006.01) |
| *B60K 17/08* | (2006.01) |
| *B60K 15/03* | (2006.01) |
| *F28D 21/00* | (2006.01) |

(52) U.S. Cl.
CPC ......... *F16H 63/302* (2013.01); *F16H 63/304* (2013.01); *F28D 1/02* (2013.01); *F28F 9/001* (2013.01); *F28F 13/06* (2013.01); *B60K 2015/0344* (2013.01); *B60K 2015/03111* (2013.01); *B60K 2015/03138* (2013.01); *B60K 2015/03473* (2013.01); *B60Y 2200/122* (2013.01); *B60Y 2300/18033* (2013.01); *F16H 2003/0822* (2013.01); *F16H 2200/00* (2013.01); *F28D 2021/0094* (2013.01)

(58) Field of Classification Search
USPC .................................................. 74/325, 335
See application file for complete search history.

(56) References Cited

U.S. PATENT DOCUMENTS

| | | | |
|---|---|---|---|
| 5,127,432 A | | 7/1992 | Duhaime et al. |
| 5,937,711 A | * | 8/1999 | McCarrick ........... B60K 17/342 74/333 |
| 6,238,312 B1 | * | 5/2001 | Tsubata ................. F16H 37/021 474/144 |
| 6,302,066 B1 | | 10/2001 | Steinmann |
| 2001/0056544 A1 | | 12/2001 | Walker |
| 2004/0077444 A1 | * | 4/2004 | Kanda ................... F16H 37/021 474/8 |
| 2004/0185973 A1 | * | 9/2004 | Sato ....................... F16H 37/021 474/8 |
| 2005/0255948 A1 | * | 11/2005 | Chonan .................... B62K 5/01 474/23 |
| 2013/0105238 A1 | | 5/2013 | Hall et al. |

* cited by examiner

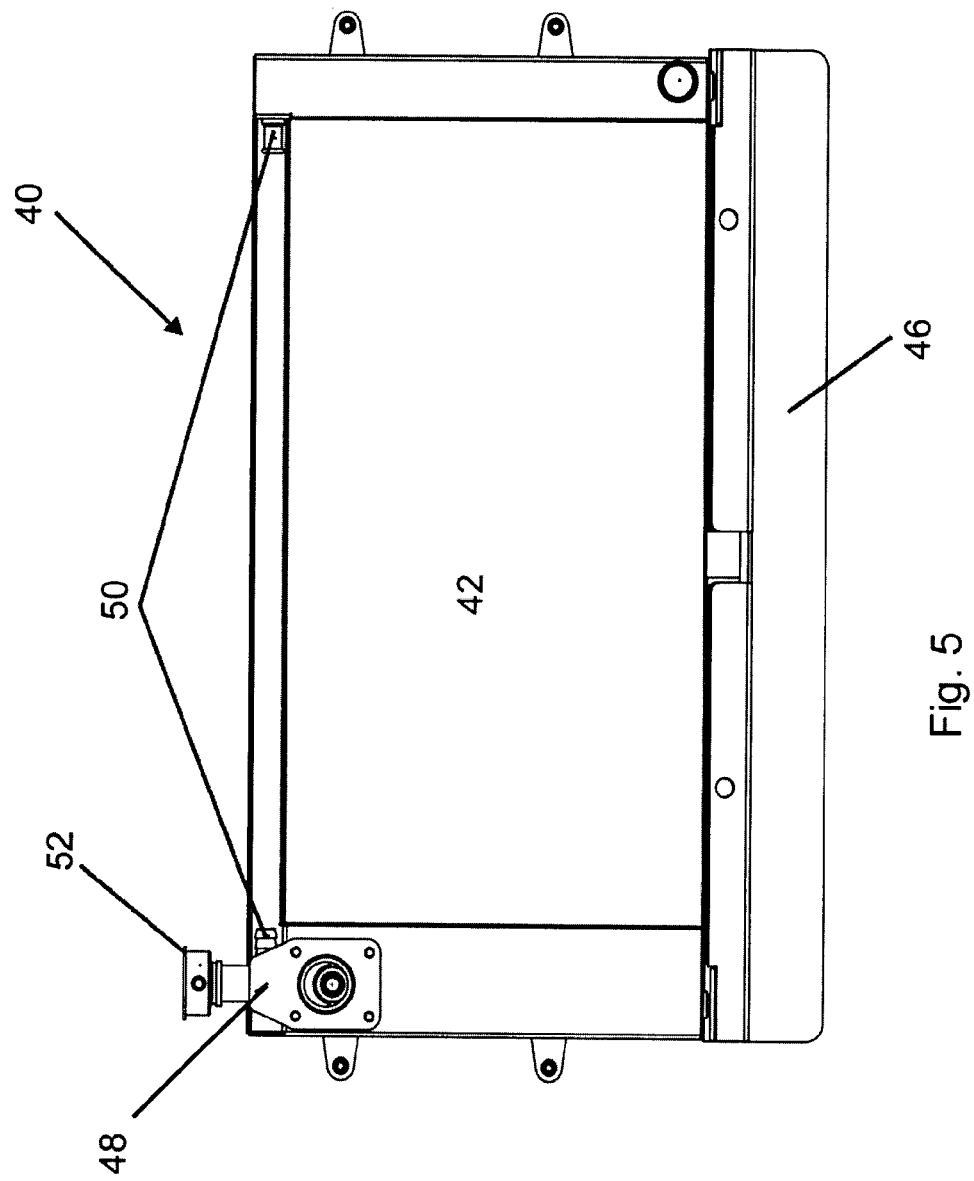

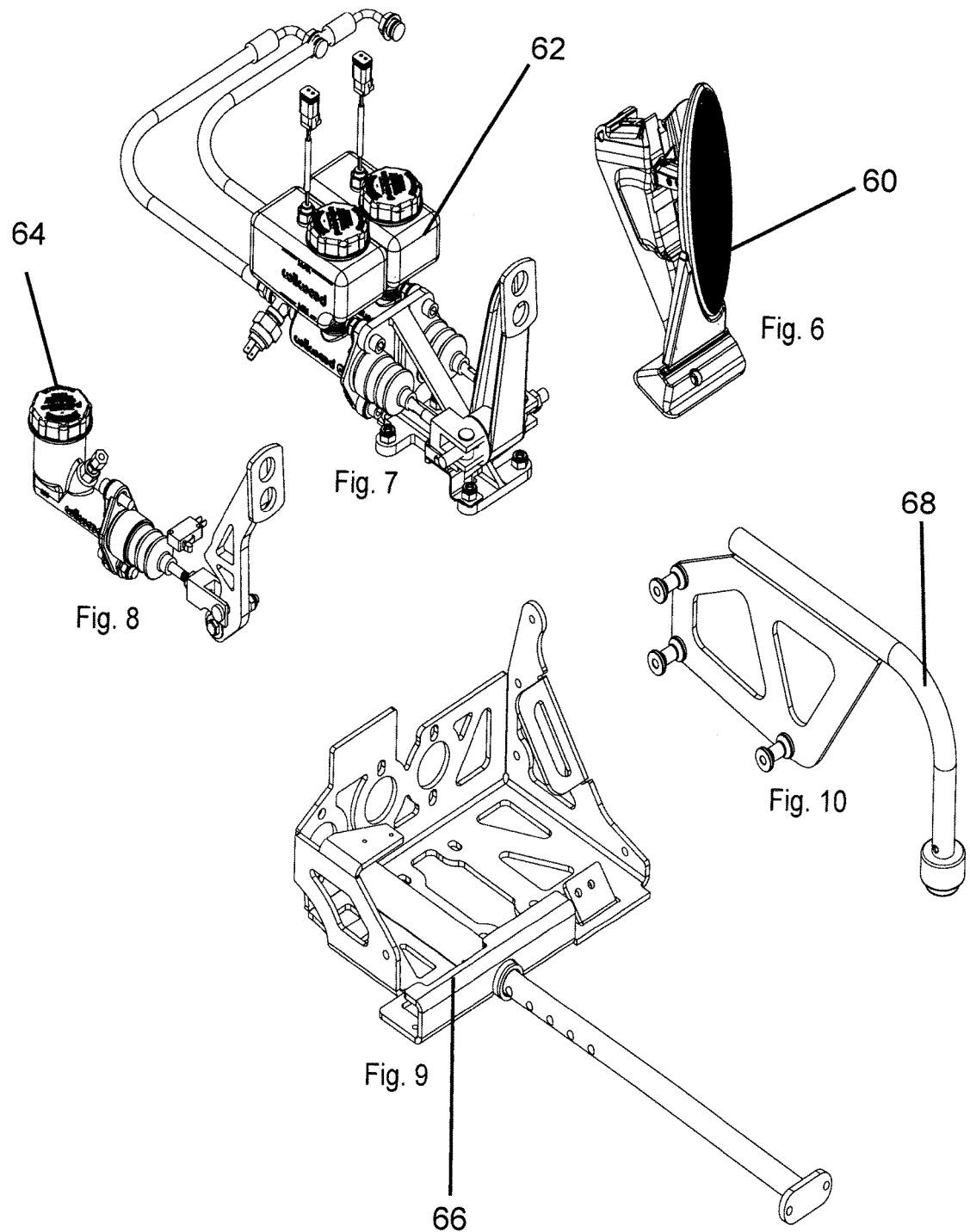

FUEL TANK, RADIATOR, PEDAL BOX ASSEMBLY, REVERSE TRANSMISSION SYSTEM AND ELECTRIC CONTROL MODULE FOR VEHICLES

CROSS-REFERENCE TO RELATED APPLICATIONS

This application is a US. National Phase application under 35 USC §371 of PCT/CA2014/000029, filed Feb. 18, 2014, which claims priority from and the benefit of U.S. Patent Application No. 61/765,926, filed on Feb. 18, 2013, the specification of which are hereby incorporated by reference.

BACKGROUND (a) Field

The subject matter disclosed generally relates to vehicle components. More particularly, the subject matter disclosed relates to fuel tanks, radiators, pedal box assemblies, reverse transmission systems and electronic control modules.

(b) Related Prior Art

A fuel tank is a safe container for flammable fluids. Though any storage tank for fuel may be so called, the term is typically applied to part of an engine system in which the fuel is stored and propelled (i.e., fuel pump) or released (i.e., pressurized gas) into an engine.

There exist on the market many different types of fuel tanks. However, none of them are adapted for three-wheel vehicles (i.e., or adapted for vehicles that may be more compact in size). The existing different types of fluid tank would then be hard to configure for three-wheel vehicles, as the three-wheel vehicles, since more compact than conventional vehicles (i.e., a car, a truck, and the like), need to maintain a substantially low center of gravity and optimize the forces applied from the liquid (i.e., the gas in the fuel tank) to the three-wheel vehicle (i.e., mechanical standards needs to be reached).

Radiator devices are used to transfer heat from one medium to another for the purpose of cooling and heating. The majority of radiators are constructed to function in automobiles, buildings, and electronics. The radiator is always a source of heat to its environment, although this may be for either the purpose of heating this environment, or for cooling the fluid or coolant supplied to it, as for engine cooling.

There exist on the market many different types of radiators. However, none of them are adapted for three-wheel vehicles (i.e., or adapted for vehicles that may be more compact in size). These different types of radiator would then be hard to configure for three-wheel vehicles.

A pedal box assembly is where the pedals are held and pivoted. An inflexible structure is typically required. In impact, the pedal box assembly can be forced in on a driver's lower leg and feet leading to significant injury.

There exist on the market many different types of pedal box assemblies. However, none of them are adapted for three-wheel vehicles. These different types of pedal box assemblies would then be hard to configure for three-wheel vehicles (i.e., mechanical standards needs to be reached).

A motorcycle transmission is a transmission created specifically for motorcycle applications. Most manual transmission two-wheelers use a sequential gearbox. Most modern motorcycles (except scooters) change gears (of which they increasingly have five or six) by foot lever. On a typical motorcycle either first or second gear can be directly selected from neutral, but higher gears may only be accessed in order (i.e., it is not possible to shift from second gear to fourth gear without shifting through third gear). A five-speed of this configuration would be known as "one down, four up" because of the placement of the gears with relation to neutral. Neutral is to be found "half a click" away from first and second gears, so shifting directly between the two gears can be made in a single movement.

Automatic transmissions are less common on motorcycles than manual transmissions, and are mostly found only on scooters and some custom cruisers and exotic sports bikes. Types include continuously variable transmission, semi-automatic transmission and dual clutch transmission.

There exist on the market many different types of motorbike transmission systems. However, none of them include a reverse transmission system (i.e., mechanical gear reverse system) adapted for three-wheel vehicles. These different types of motorbike transmission systems would then be hardly configurable for three-wheel vehicles that would need to include a reverse mode.

Therefore, there exists a need for fuel tanks, for radiators, for pedal box assemblies, for reverse transmission systems, and for electronic control modules configured for three-wheel vehicles.

SUMMARY

According to an embodiment, there is provided a fuel tank configured to be connected to a vehicle and for preventing fuel starvation of fuel caused by a lateral acceleration, the fuel tank comprising: a main body having a first end and a second end; a first reservoir about the first end of the main body comprising a fuel inlet and a baffled section having a waved surface for increasing surface area for an optimized fuel pick-up; a second reservoir about the second end of the main body connected to the first reservoir, the second reservoir having an outlet configured to be connected to an engine; a fuel transfer system inbetween the first and second reservoirs for transfer of the fuel back and forth between the first and second reservoirs for providing a substantially constant fuel level within the first and second reservoirs, thereby preventing the fuel starvation in the second reservoir.

According to another embodiment, the main body is elongated.

According to a further embodiment, the fuel transfer system is inside the main body.

According to yet another embodiment, the fuel transfer system comprises a fuel transfer pump for pumping the fuel from the first reservoir to the second reservoir.

According to a further embodiment, the second reservoir further comprises an overflow port for transferring the fuel from the second reservoir to the first reservoir when the second reservoir is full of fuel.

According to yet another embodiment, the fuel tank may further comprise a level sensor about the main body for measuring the fuel level within the first and second reservoirs.

According to another embodiment, the fuel tank may further comprise a high pressure fuel pump about the second reservoir.

According to a further embodiment, the fuel tank may further comprise an electronic fuel pressure regulator connected to the high pressure fuel pump within the second reservoir.

According to yet another embodiment, the electronic fuel pressure regulator is controlled by a vehicle engine management system.

According to another embodiment, the high pressure fuel pump comprises an original engine fuel pump.

According to a further embodiment, the fuel tank may further comprise a filler neck extending from the inlet.

According to another embodiment, there is provided a radiator for a vehicle comprising: a main body comprising: an inlet configured to be connected to an engine cooling liquid outlet; an outlet configured to be connected to a pump; and a lower portion; and a deflector member downwardly extending from the lower portion of the main body for directing air near a ground surface when the vehicle is in motion.

According to a further embodiment, the radiator may further comprise a thermostat housing about the main body for preheating the vehicle at startup of the vehicle.

According to yet another embodiment, the deflector member is configured to reduce air turbulence under the radiator.

According to another embodiment, the deflector member is configured to eliminate the air turbulence under the radiator.

According to yet another embodiment, the deflector member is substantially of a rectangular configuration.

According to another embodiment, the deflector member is connected to the lower portion of the main body at an obtuse angle with the lower portion of the main body.

According to a further embodiment, the deflector member is at least one of: deformable and elastic.

According to yet another embodiment, the thermostat housing further comprises a radiator and a thermostat bypass system configured to be connected to the engine cooling liquid outlet and an engine cooling liquid inlet, for circulation of a cooling liquid from the engine cooling liquid outlet to the engine cooling liquid inlet to accelerate warming of the cooling liquid.

According to another embodiment, the radiator may further comprise a filler neck integrated in the thermostat housing.

According to a further embodiment, at least one of: the main body, the deflector member and the thermostat housing comprises a material having optimized cooling capacities.

According to yet another embodiment, the at least one of: the main body, the deflector member and the thermostat housing comprises aluminum.

According to another embodiment, there is provided a pedal box assembly for a vehicle comprising: a brake pedal assembly configured to be mounted on a frame of the vehicle, the brake pedal being electrically coupled to an engine management system and hydraulically coupled to a braking system; an accelerator pedal configured to be mounted on the frame of the vehicle about the brake pedal, the accelerator pedal being electrically coupled to the engine management system and providing an electronic throttle control of the vehicle; and a double circuit normally closed brake switch mounted on the frame of the vehicle about at least one of: the brake pedal assembly and the accelerator pedal hydraulically coupled to the brake pedal, and electrically coupled to the engine management system and to the accelerator pedal, and configured for deactivating a throttle signal to an engine when the brake pedal assembly and the accelerator pedal are co-activated.

According to a further embodiment, the pedal box assembly may further comprise a clutch pedal assembly configured to be mounted on the frame of the vehicle about at least one: the brake pedal assembly and the accelerator pedal, the clutch pedal assembly being hydraulically coupled to a clutch system in the engine.

According to yet another embodiment, the accelerator pedal comprises a drive by wire accelerator pedal.

According to another embodiment, the double circuit normally closed brake switch is electrically coupled and in parallel with the engine management system.

According to a further embodiment, the accelerator pedal comprises two circuits electrically coupled to the engine management system.

According to yet another embodiment, the clutch pedal assembly is further electrically coupled with the engine management system.

According to yet another embodiment, the pedal box assembly may further comprise a security stopper to prevent a passenger of the vehicle from contacting the accelerator pedal.

According to another embodiment, the engine management system deactivates the throttle signal when the brake pedal assembly and the accelerator pedal are co-activated.

According to a further embodiment, the pedal box assembly is mounted on the frame.

According to another embodiment, there is provided a reverse transmission system for a vehicle for engaging a reverse action on a normally forward action only engine transmission having a longitudinal orientation driveshaft output, the reverse transmission system comprising: a gear rotatably connected to the longitudinal orientation driveshaft output of a normally forward action only engine transmission output; a shaft rotatably connected to the gear for transmitting power from the normally forward action only engine transmission to the shaft; a chain sprocket connected to a chain drive and to the shaft for providing a transverse orientation output to the chain drive to change the direction of rotation of the driveshaft output, thereby for engaging the vehicle in the reverse action.

According to a further embodiment, the reverse transmission system may further comprise a reverse fork configured to actuate a reverse dog configured to slide upon the shaft to reversibly engage a reverse gear engaged to a first gear of the engine transmission.

According to yet another embodiment, the shaft is engaged to the gear engaged to the longitudinal orientation driveshaft output.

According to another embodiment, the reverse dog engages the reverse gear to reverse the rotation of the longitudinal orientation driveshaft output to engage the vehicle in a backward motion.

According to a further embodiment, the reverse gear uses a first gear of the engine transmission to power a backward motion.

According to yet another embodiment, the reverse transmission may further comprise a motor for activating the reverse fork.

According to another embodiment, there is provided an electronic control module comprising: a first controller configured to be connected to a vehicle user control system of a vehicle, the vehicle user control system comprising a reverse system; a second controller operatively connected to the first controller configured to be connected to a reverse lighting system of the vehicle; and a third controller operatively connected to at least one of: the first controller and the second controller, configured to engage the reverse system and engage a lock mechanism on the reverse system to prevent a user from shifting a gear when the reverse system is engaged.

According to a further embodiment, at least one of: the first controller, the second controller and the third controller provides an interface between a plurality of user controls and a plurality of original motorcycle controls.

According to yet another embodiment, when the first controller receives at least one of: a neutral signal, a no speed signal, a clutch switch activated signal and a reverse button activation signal, the third controller engages the reverse system in a reverse position.

According to another embodiment, the reverse position is engaged when the electronic control module receives at least one of: a neutral signal, a no speed signal, a clutch switch activation signal and a reverse button activation signal.

According to a further embodiment, the electronic control module may further configured to activate a fuel pump when an ignition switch is activated.

According to yet another embodiment, the fuel pump is activated when a rpm signal is detected.

According to another embodiment, the electronic control module deactivates the fuel pump when an engine stalls.

According to a further embodiment, the reverse lighting system is electrically coupled to a motor functions control module.

According to yet another embodiment, the electronic control module may further be configured for at least one of: a hazard lights activation, a hazard lights deactivation, a flashing lights activation, a flashing lights deactivation, a high beams activation, and a high beams.

According to another embodiment, the electronic control module may further be configured for activating an oil warning light when at least one of: a rpm signal is over about 2500 RPM and an oil pressure is below about 30 psi.

The following terms are defined below.

The term "vehicle user control system" is intended to mean the system permitting the user of a vehicle to control its motion, such as forward and backward motion, steering, acceleration and deceleration (e.g. breaking), and the like. The vehicle user control system may include the accelerator pedal, the brake pedal assembly, the clutch pedal assembly, the steering wheel, sticks, levers, buttons, gears and any and all electrical and hydraulic wiring and systems necessary for controlling the vehicle.

The term "motor function control module" is intended to mean any system (electronic, mechanical, or combinations thereof) that manages the motor functions of a vehicle.

The term "reverse system" is intended to mean the system of a vehicle permitting the user of a vehicle to control the reverse motion of the vehicle. The reverse system may include the mechanical elements necessary for the vehicle to move in reverse (e.g. gears, shafts, and other parts), as well as the electrical, hydraulic or electronic elements necessary to activate and actuate such mechanical elements.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 5 is a front elevation view of the radiator of FIG. 4;

FIG. 6 is a perspective view of a throttle pedal in accordance with another embodiment;

FIG. 7 is a perspective view of a brake pedal in accordance with another embodiment;

FIG. 8 is a perspective view of a clutch pedal in accordance with another embodiment;

FIG. 9 is a perspective view of a pedal box assembly in accordance with another embodiment;

FIG. 10 is a perspective view of a security stopper in accordance with another embodiment;

It will be noted that throughout the appended drawings, like features are identified by like reference numerals.

DETAILED DESCRIPTION

In embodiments there are disclosed vehicle components. More particularly, there are disclosed fuel tanks, radiators, pedal box assemblies, reverse transmission systems and electronic control modules for vehicles, and more particularly, configured to fit in a three-wheel vehicle (i.e., a compact three-wheel vehicle).

Figure 1:
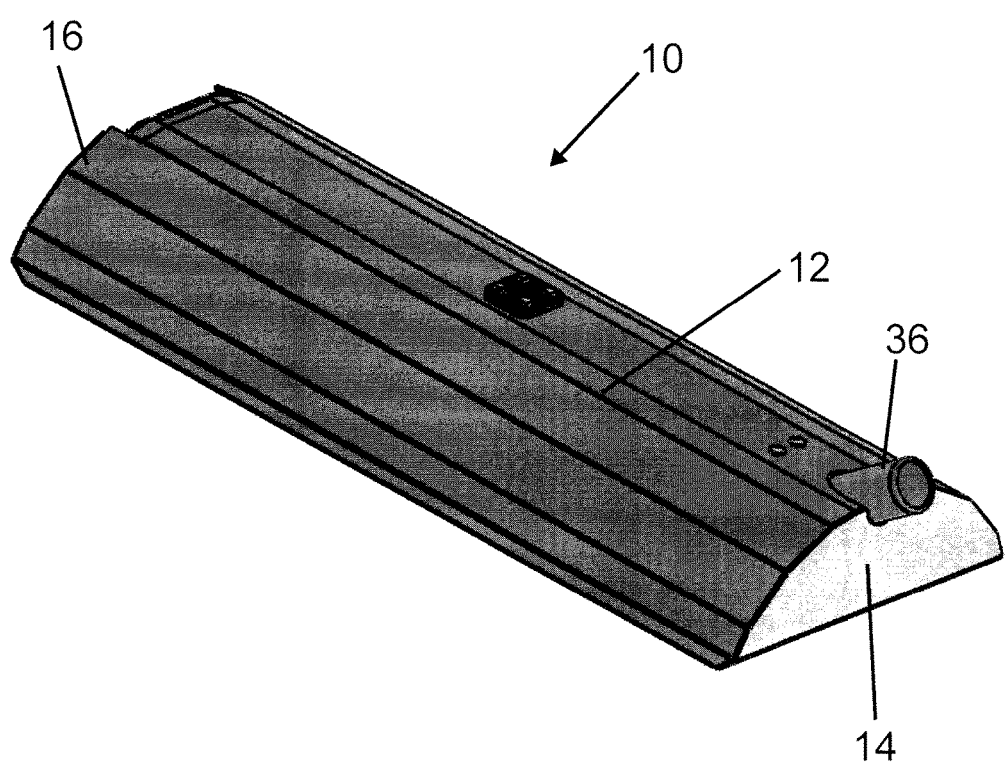
FIG. 1 is a perspective view of a fuel tank in accordance with an embodiment.
Figure 2:
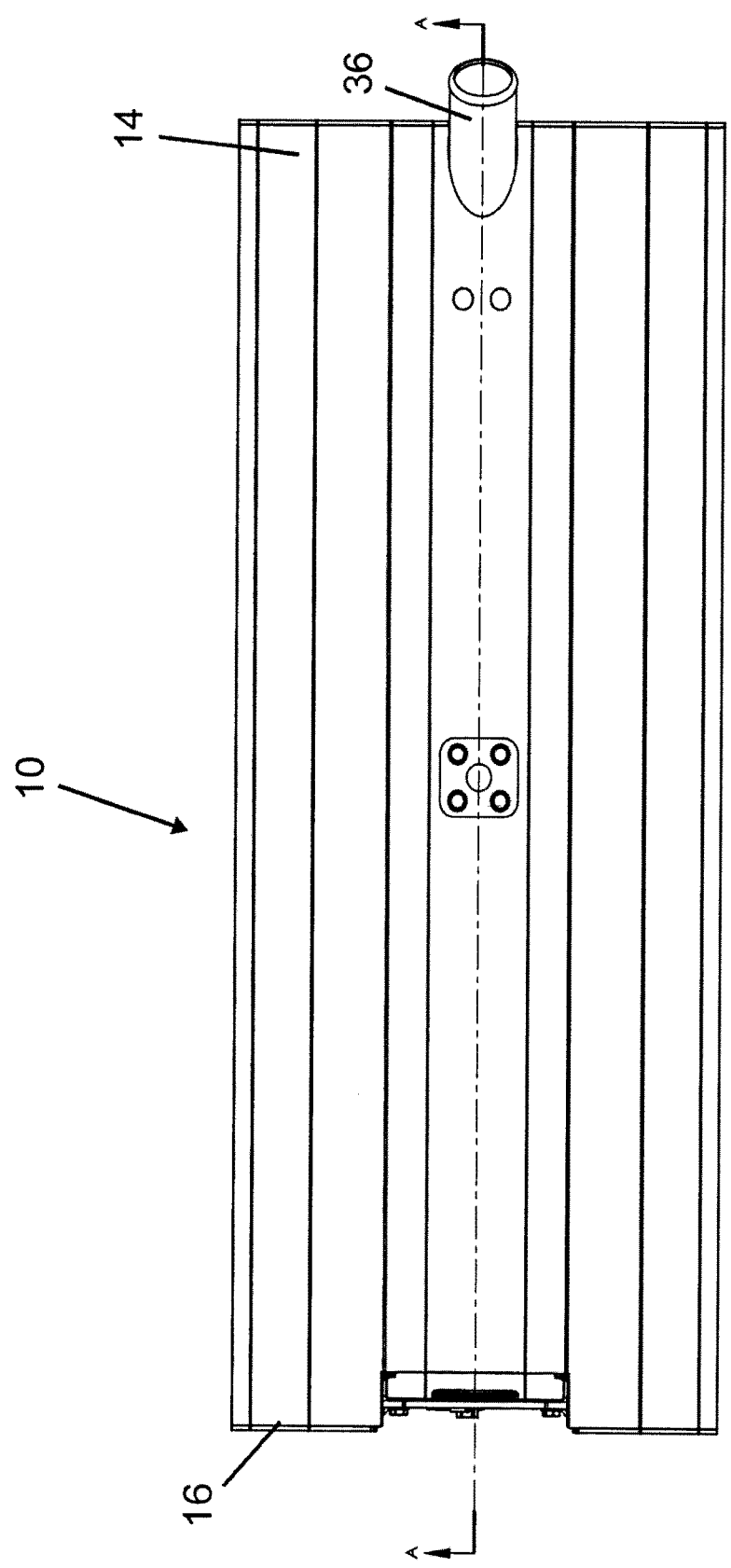
FIG. 2 is a top plan view of the fuel tank of FIG. 1.
Figure 3:
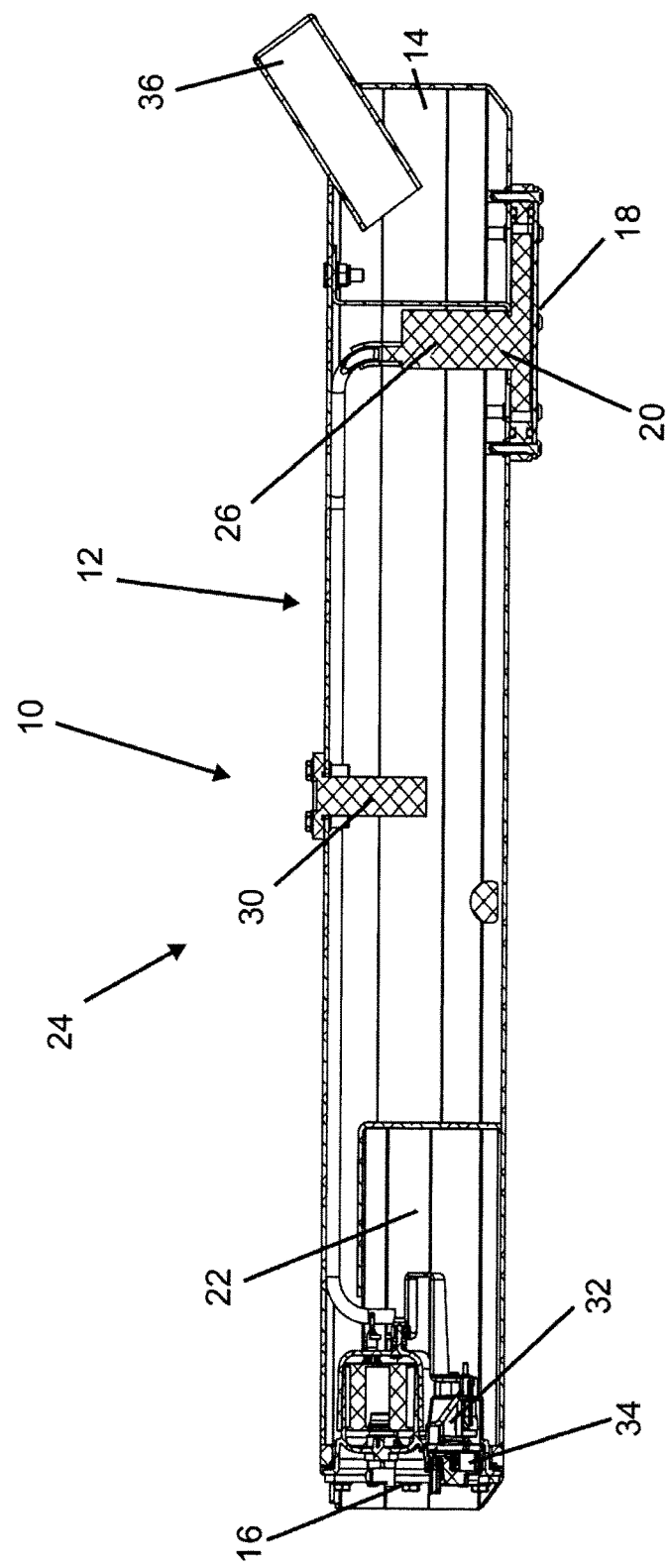
FIG. 3 is a cross sectional view taken along line A-A of the fuel tank of FIG. 1.

Referring now to the drawings, and more particularly to FIGS. 1-3, there is shown a fuel tank which is configured to be connected to a vehicle and prevent fuel starvation during lateral acceleration (i.e., such as rapid lateral acceleration) of the vehicle, in accordance with an embodiment. The fuel tank 10 is configured for an optimal performance during lateral acceleration of a vehicle (not shown). The fuel tank 10 includes a main body 12 which has a first end 14 and a second end 16. The main body 12 may be elongated in shape or may have any other suitable shape such as to fit in the vehicle inside space. The fuel tank 10 also includes a first reservoir 18 at the first end 14 of the main body 12. The first reservoir 18 includes a fuel inlet and a baffled section 20 for allowing an optimized fuel pick-up. The baffled section 20 has a waved surface for increased surface area of the baffled section 20, to optimize fuel pickup. The fuel tank 10 also includes a second reservoir 22 at the second end 16 of the main body 12. The second reservoir 22 is connected to the first reservoir 18 for transportation of the fuel from the second reservoir 22 to the first reservoir 18 and from the second reservoir 22 to the first reservoir 18. Furthermore, the fuel tank 10 includes a fuel transfer system 24. According to an embodiment, the fuel transfer system 24 may be inside the elongated main body 12 for allowing transfer of the fuel from the first reservoir 18 to the second reservoir 22 and from the second reservoir 22 to the first reservoir 18 (i.e., back and forth between the first and second reservoirs 18, 22). The fuel transfer system 24 is useful for providing a substantially constant fuel level within the first and second reservoirs 18, 22. This configuration of the fuel tank 10 allows for an optimal performance of the first and second reservoirs 18, 22 during lateral acceleration of the vehicle.

Still referring to FIGS. 1-3, the fuel transfer system 24 of the fuel tank 10 includes a fuel transfer pump 26 for transfer of the fuel from the first reservoir 18 to the second reservoir 22 and providing a substantially constant fuel level in first and second reservoirs 18, 22. Also, the second reservoir 22 further includes an overflow port. The overflow port allows the fuel to be transferred from the second reservoir 22 to the first reservoir 18 when the second reservoir 22 is full of fuel.

The fuel tank 10 also includes a lever sensor 30 in the main body 12 for measuring the fuel level in the first reservoir 18. The fuel tank 10 also includes a high pressure fuel pump 32 within the second reservoir 22 and an electronic fuel pressure regulator 34 connected to the high pressure fuel pump 32 within the second reservoir 22. The electronic fuel pressure regulator 34 is controlled by a vehicle engine management system (not shown). It is to be noted that the high pressure fuel pump 32 may be an original engine fuel pump or any other suitable fuel pump. The fuel tank 10 further includes a filler neck 36 extending from the elongated main body 12.

As shown in FIG. 1, the shape of the fuel tank is configured to fit under a three wheel (e.g. T-REX) vehicle body panel and under a driver and a passenger knees. It is to be noted that the presence of the second reservoir 22 within the fuel tank 10 is to avoid the fuel starvation problems which may arise during the rapid lateral acceleration that the vehicle is capable of.

The fuel tank 10 is adapted for a three-wheel vehicle in an optimized configuration to fit in the frame of the vehicle (i.e., under a person's knees). The fuel tank 10 prevents fuel starvation from a lack in pressure in the fuel tank (i.e., first reservoir 18 vs. second reservoir 22). Thus, no external component related to fuel needs is needed outside the frame of the vehicle.

Figure 4:
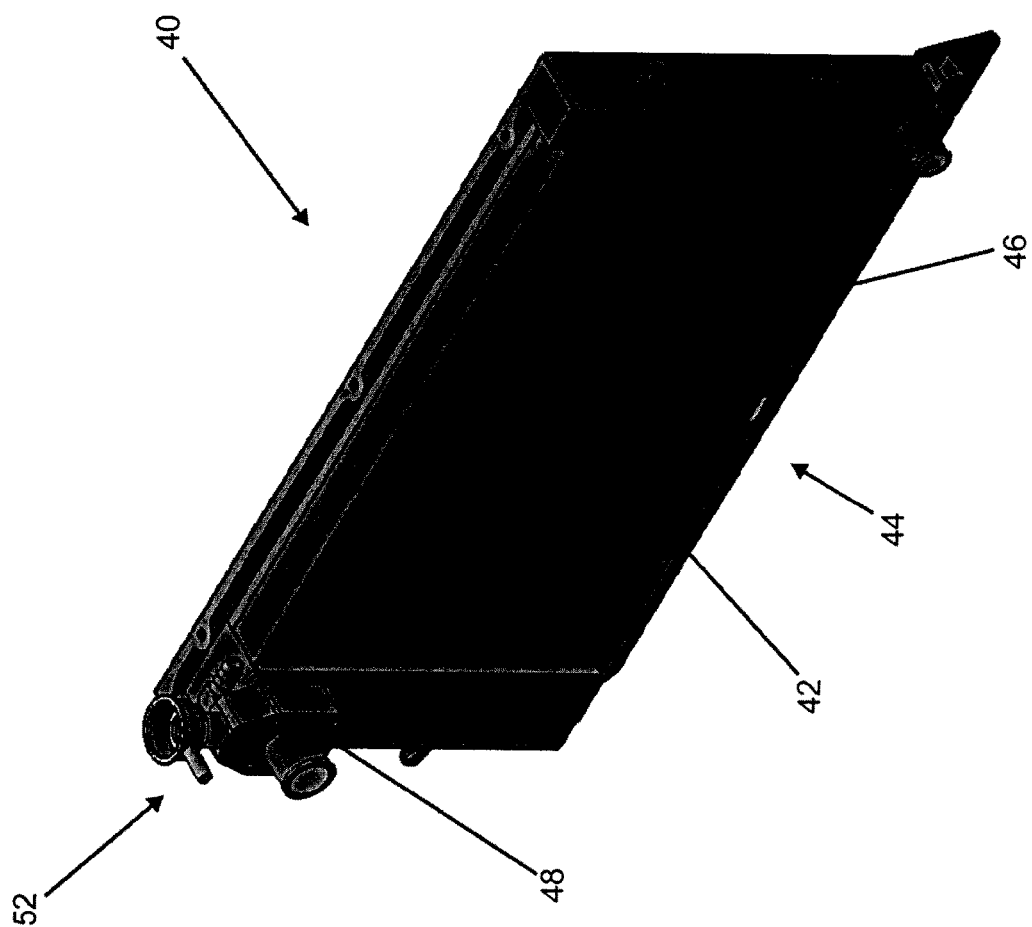
FIG. 4 is a perspective view of a radiator in accordance with another embodiment.
Figure 11:
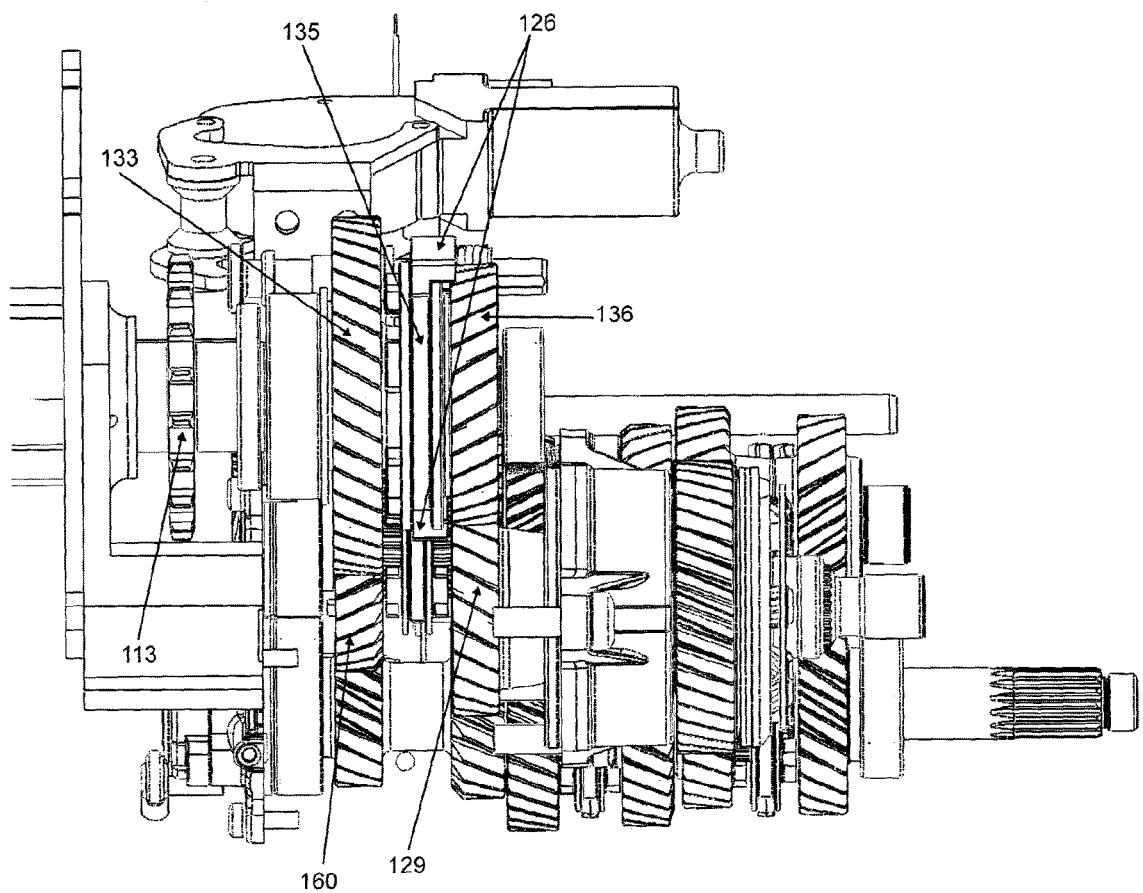
FIG. 11 is a top view of a reverse transmission system in accordance with another embodiment.
Figure 12:
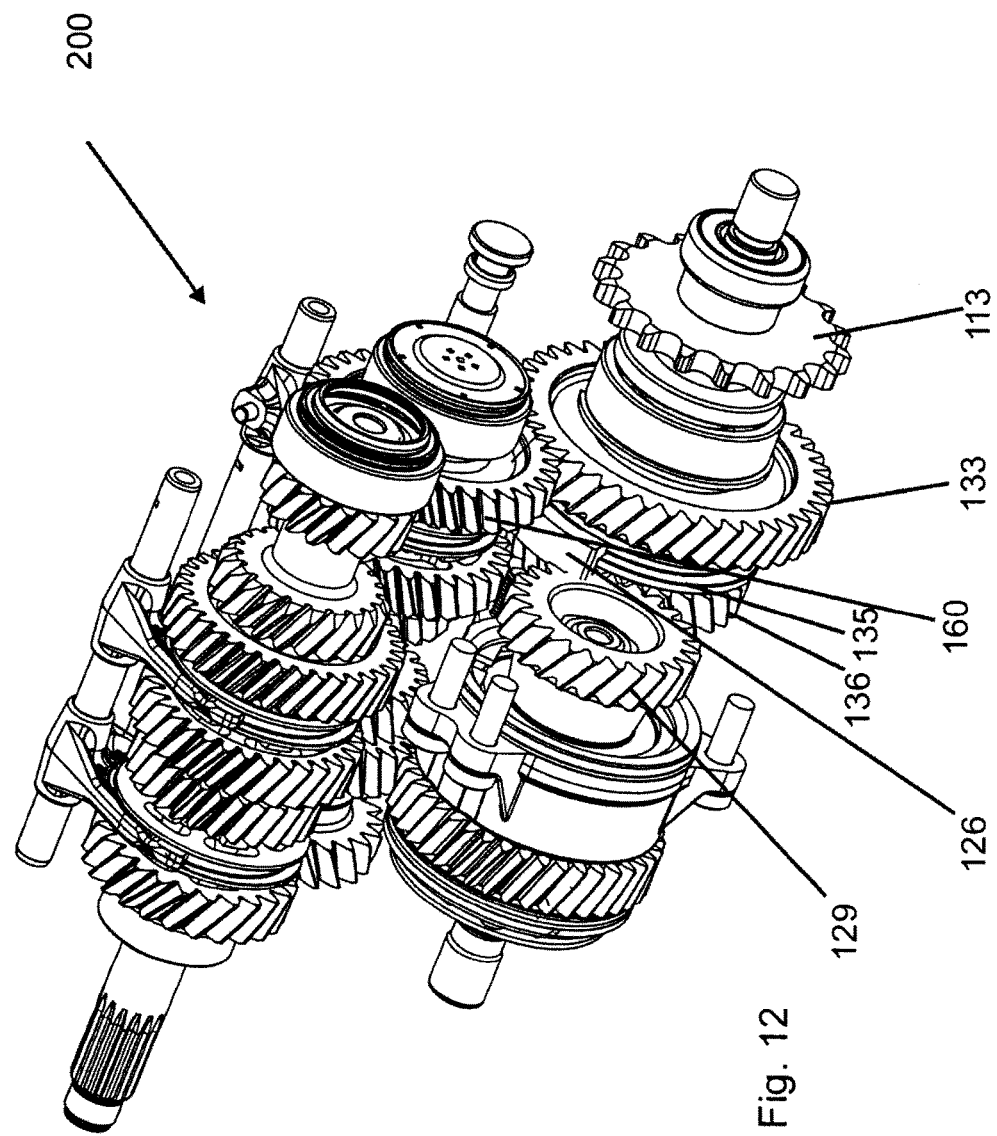
FIG. 12 is a perspective view of a reverse transmission system in accordance with another embodiment.
Figure 13:
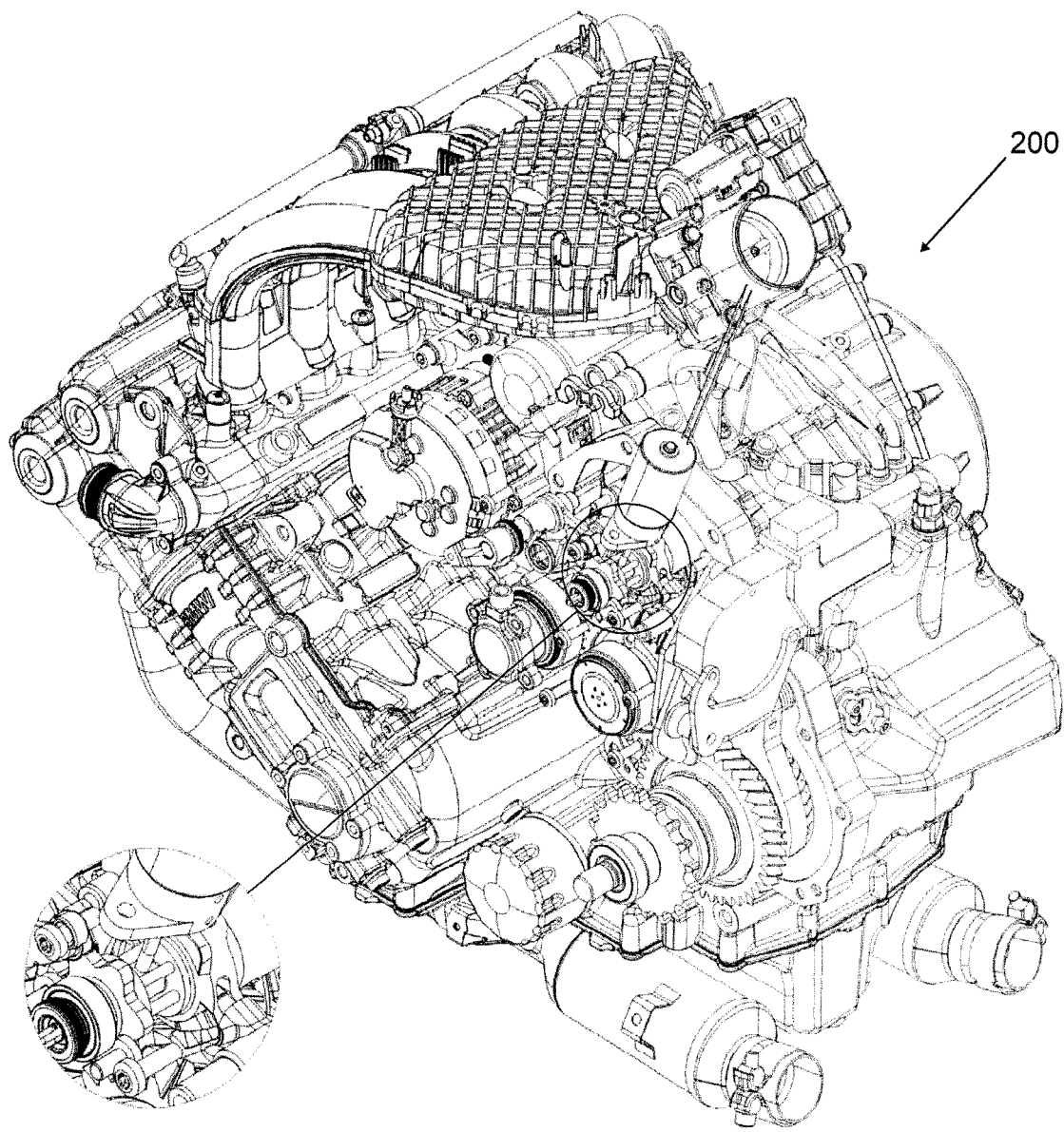
FIG. 13 is another perspective view of the reverse transmission system of FIG. 12.
Figure 14:
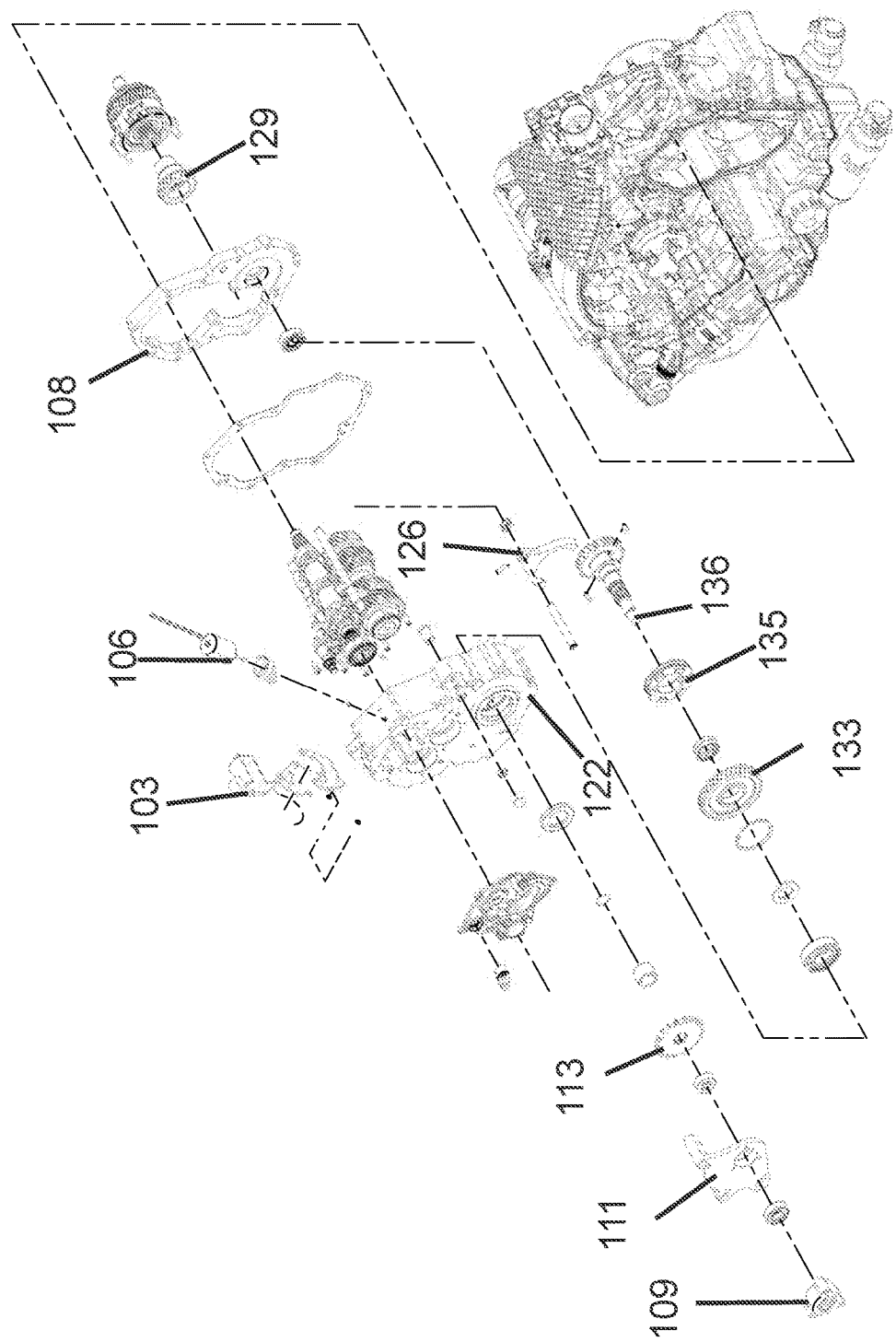
FIG. 14 is an exploded view of the reverse transmission system of FIG. 12.

According to another embodiment and referring now to FIGS. 4-5, there is shown a radiator 40. The radiator 40 for a vehicle includes a main body 42, having an inlet configured to be connected to an engine cooling liquid outlet (not shown), and an outlet configured to be connected to a pump (not shown), and a lower portion 44 and a deflector member 46 which is downwardly extending from the lower portion 44 of the main body 42. The deflector member 46 is for collecting (i.e., or redirecting) air near a ground surface when the vehicle is in motion. According to an embodiment, the pump (not shown) may be the water pump of the engine which is used to recirculate the cooling fluid of the engine. According to another embodiment, the radiator 40 may also include a thermostat housing 48 on the main body 42.

Still referring to FIGS. 4-5, the shape of the radiator 40 is configured to fit in a T-REX three-wheel vehicle. The deflector member 46 is configured to reduce air turbulence under the radiator 40. According to another embodiment, the deflector member 46 is substantially rectangular. According to another embodiment, the deflector member 46 is connected to the radiator lower portion 44, at an obtuse angle (i.e., about more or less 5 degrees) with the radiator lower portion 44. This configuration is believed to allow an optimal reduction/elimination of air turbulence underneath the vehicle, and provides effective cooling. According to another embodiment, the deflector member 46 is deformable and/or elastic. For example, the deflector member 46 may be made from polyurethane resins sufficiently rigid to resist to the flow of air under the vehicle, but capable of deforming and return to its original configuration after an impact with a speed bump, for example.

According to an embodiment, the thermostat housing 48 of the radiator 40 further includes a radiator and thermostat bypass system 50 for preheating the vehicle at startup and improving the exhaust emissions. According to an embodiment, the radiator and thermostat bypass system 50 is configured to be connected to an engine cooling liquid outlet and an engine cooling liquid inlet (not shown). The engine cooling liquid may circulate in the bypass system 50 and reenter the engine's fluid circulation without having to contact the thermostat housing 48 and the radiator 40. This direct recirculation of the engine cooling fluid accelerates warming of the engine cooling fluid when the engine is started from a cold start. Acceleration of the warming of the cooling fluid contributes to the rapid warming of the engine, which results in better combustion performance of the engine and improved exhaust emissions. Furthermore, rapid warming of the cooling fluid also allows the thermostat housing 48 to rapidly measure the cooling fluid temperature and regulate it when it becomes too hot.

The radiator 40 further includes a filler neck 52 integrated in the thermostat housing 48.

It is also to be noted that at least one of the main body 42, the deflector member 46 and the thermostat housing 48 may comprise a material having optimized cooling capacities. The main body 42, the deflector member 46 and the thermostat housing 48 may include an aluminum material, or any other suitable material.

According to another embodiment and referring now to FIGS. 6-10, there is shown an accelerator (or throttle) pedal 60, a brake pedal assembly 62 (also including master cylinder), a clutch pedal assembly 64 (also including master cylinder), a frame 66 and a security stopper 68. The pedal box assembly integrates a «drive by wire» accelerator pedal 60 to make a motorcycle engine work in a vehicle. The «drive by wire» accelerator pedal 60 replaces a standard handlebar control accelerator found on a motorcycle. The pedal box assembly according to another embodiment also features a double circuit normally closed brake switch to meet the safety standard in electronic throttle accelerator. According to an embodiment, the double circuit normally closed brake switch is hydraulically coupled to the brake pedal assembly 62, and electrically coupled to the engine management system, and to the accelerator pedal 60. According to an embodiment, the double circuit normally closed brake switch is configured for deactivating a throttle signal to an engine when the brake pedal assembly 62 and the accelerator pedal 60 are co-activated. According to another embodiment, the double circuit normally closed brake switch works in parallel with the engine management system (not shown) to permit the deactivation of the throttle signal if the brake pedal assembly 62 and throttle pedal 60 are activated at the same time. It also features two normally closed circuits so the engine management system (not shown) can do random safety tests to verify that the system is working properly. Normally closed switches according to an embodiment may be diagnosed for their proper functioning. As they are normally closed, their continuity may be tested by an onboard computerized system and ensure the good functioning of the switches.

According to another embodiment and referring now to FIGS. 11-14, there is shown a reverse transmission system 200. The reverse transmission system 200 is an add-on feature to an original engine transmission. The original engine transmission is a normally forward only transmission of a vehicle that has a longitudinal orientation driveshaft output. The reverse transmission system according to another embodiment may be used in a vehicle that is chain or belt driven, and the output of the reverse needs to be made transverse for the vehicle to move in reverse. Basically, the reverse transmission system 200 needs to change the rotation of an original output and make a vehicle go backward or forward.

Original motorcycle transmission shafts are turning when in neutral position, but nothing is engaged to the final drive. The reverse transmission system 200 includes a gear 129 connected to the output shaft of the original transmission to transmit power to a shaft 136 that is linked to the chain sprocket 113. This way, a transverse orientation output can be achieved to integrate to a chain drive.

Therefore, according to an embodiment, there is provided a reverse transmission system 200 for a vehicle, for engaging a reverse action on a normally forward action only engine transmission having a longitudinal orientation driveshaft output. The reverse transmission system 200 includes a gear 129 rotatably connected to the driveshaft output 150 of the transmission output; a shaft 136 rotatably connected to the gear 129 for transmitting power from the engine transmission to the shaft 136; and a chain sprocket 113 connected to a chain drive and to the output shaft 136 for providing a transverse orientation output to the chain drive to change the direction of rotation of the driveshaft output for engaging the vehicle in a reverse action.

The reverse transmission system 200 includes a reverse fork 126, a reverse dog 135 and a reverse gear 133. The output shaft 136 is always engaged to gear 129. This way, when the reverse dog 135 is engaged to the reverse gear 133, the rotation of the output shaft 136 is inverted and then the vehicle can go backward. According to an embodiment, the reverse fork 126 is configured to actuate the reverse dog 135. The reverse dog 135 is configured to slide upon the output shaft 136 to reversibly engage a reverse gear 133 which is engaged to the driveshaft output 150. For example, the reverse dog 135 transversely moves from the left to the right, sliding upon shaft 136. When the reverse dog 135 slides to the left, it engages reverse gear 133, which is permanently engaged to the first gear 160 of the original transmission. When the original transmission is in neutral position, the driveshaft output 150 is disengaged from the original transmission. At this moment, the reverse gear 133 may be engaged to the first gear of the original transmission, as the shaft 136 is disengaged from the original transmission. Once the reverse dog 135 is engaged to reverse gear 133, the reverse function may be engaged and the vehicle may proceed in reverse. When the reverse dog 135 slides back to the right, the vehicle may proceed in the forward direction.

The reverse gear 133 is using the first gear 160 of the original transmission to take power to go backward. To be able to go backward, the reverse transmission system needs to be in neutral to disengage the output shaft 136 with the original transmission shaft. Then, a user needs to press the clutch, engage the reverse and release the clutch accordingly to move the vehicle backward. The reverse fork 126 is activated by an electric motor 103 controlled by a button on a shifter lever in the vehicle. The reverse transmission system also includes an electric solenoid 106 to control a lock system of the shift lever.

An electronic control module (as described below, not shown) may control the reverse transmission system 200 activation. For the reverse fork 126 to be activated, the electronic control module needs to read neutral signal, clutch signal, speed signal and/or RPM signal. An electric solenoid 106 then activates a lock on the shift lever so the user is not able to put the vehicle in any gear during the reverse operation. Right after that, the reverse fork motor 103 is activated. This reverse transmission system 200 is a safety system to ensure the reverse is not activated in any gear except neutral and that the system cannot be activated if speeds are over about 3 km/h.

The custom transmission casings 108, 122, 111, 109 are designed to fit shafts and the original motorcycle shafts and bearings. These casings 108, 122, 111, 109 include all the original oil passages from the engine to ensure proper shafts, bearings and gears lubrication. The casing 122 also permits the installation of the original motorcycle cover to hold the clutch slave cylinder.

According to another embodiment, there is provided an electronic control module (or ECM) (not shown) to add safety features to an electronic reverse control and to act as an interface between the vehicle user control (i.e., such as a T-REX user controls) and the original motorcycle controls (BMS or the motor functions control module). The features of the ECM are as follows:

According to an embodiment, the ECM includes a first controller configured to be connected to a vehicle user control system of a vehicle which includes a reverse system; a second controller configured to be connected to a reverse lighting system of the vehicle; and a third controller configured to engage the reverse system and engage a lock mechanism on the reverse system to prevent a user from shifting a gear when the reverse system is engaged.

According to an embodiment, the first, second or third controllers may be independent controllers. According to another embodiment, the first, second and third controllers may all be part of a single multifunctional controller. According to yet another embodiment, the first, second and third controller may be one or more controller.

According to an embodiment, the ECM may engage the reverse system while engaging the lock mechanism of the vehicle user control system in order to prevent the user from shifting in gear while in reverse. To engage the reverse, the ECM, through the first controller, needs to read neutral signal, no speed signal (about 3 km/h or less), clutch switch activated and the reverse button activation signals. When the conditions are met, the third controller may engage the reverse system in a reverse position.

According to another embodiment, the ECM may activate the fuel pumps for about 5 seconds when the ignition switch is activated, to prime the fuel system. According to another embodiment, the ECM may activate the fuel pumps full time when the rpm signal is detected. According to another embodiment, the ECM may deactivate the fuel pumps if the engine stalls with ignition activated.

According to another embodiment, the ECM may send a signal to the BMS for hazard lights activation and deactivation. According to another embodiment, the ECM may send a signal to the BMS for flashing lights activation and deactivation. According to another embodiment, the ECM may send a signal to the BMS for high beams activation and deactivation.

According to another embodiment, the ECM may be used for controlling safety parameters of the vehicle. For example, the ECM may send activate an oil warning light when conditions are for example RPM over 2500 and/or oil pressure below 206.8 kPa.

According to another embodiment, the ECM may be water resistant.

According to another embodiment, the ECM may resist to a temperature up to about 70° C.

According to another embodiment, the ECM may be physically compact.

According to another embodiment, the ECM may further include one or more, and more particularly two, resistant connectors (automobile connector type).

According to another embodiment, the ECM may control the rearward conditions of the vehicle.

According to another embodiment, the ECM may control the use conditions of the fuel transfer pump.

According to another embodiment, the ECM may emit a pulsation for stopping operation of the flashing lights when no longer in use.

According to another embodiment, the ECM may maintain on high beam lights after receiving a pulse and off after a second pulse.

According to another embodiment, the ECM may further allow the activation of a light indicator when the oil pressure sensor does not meet state conditions, such as, without limitation, rpm conditions, time conditions, and the like.

According to another embodiment, the ECM may cancel the two independent signals from the accelerator pedal when the driver pushes on the brake pedal.

According to another embodiment, the ECM may light the starting button when the ignition key is on, but the motor is off.

According to another embodiment, the ECM may light the defective indicator of the brake about 5 seconds when the ignition key is on.

According to another embodiment, the ECM may prevent the vehicle to start without depressing the clutch pedal.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A reverse transmission system for a vehicle for engaging a reverse action on a normally forward action only engine transmission having a longitudinal orientation driveshaft output, the reverse transmission system comprising:
    a gear rotatably connected to the longitudinal orientation driveshaft output of a normally forward action only engine transmission output;
    a shaft rotatably connected to the gear for transmitting power from the normally forward action only engine transmission output to the shaft;
    a chain sprocket connected to a chain drive and to the shaft for providing a transverse orientation output to the chain drive to change the direction of rotation of the driveshaft output, thereby for engaging the vehicle in the reverse action; and
    a reverse fork configured to actuate a reverse dog configured to slide upon the shaft to reversibly engage a reverse gear engaged to a first gear of the engine transmission.

2. The reverse transmission system of claim 1, wherein the shaft is engaged to the gear engaged to the longitudinal orientation driveshaft output.

3. The reverse transmission system of claim 1, wherein the reverse dog engages the reverse gear to reverse the rotation of the longitudinal orientation driveshaft output to engage the vehicle in a backward motion.

4. The reverse transmission system of claim 1, wherein the reverse gear uses a first gear of the engine transmission to power a backward motion.

5. The reverse transmission system of claim 1, further comprising a motor for activating the reverse fork.

* * * * *